United States Patent [19]

Hickling et al.

[11] 4,164,867

[45] Aug. 21, 1979

[54] METHOD OF MEASUREMENT OF BULK TEMPERATURES OF GAS IN ENGINE CYLINDERS

[75] Inventors: Robert Hickling, Huntington Woods; James A. Hamburg, Southfield; Douglas A. Feldmaier, Birmingham; Jing-yau Chung, Troy, all of Mich.

[73] Assignee: General Motors Corporation, Detroit, Mich.

[21] Appl. No.: 937,066

[22] Filed: Aug. 28, 1978

[51] Int. Cl.² ............................................. G01K 1/02
[52] U.S. Cl. .......................................... 73/346; 73/35; 73/339 A
[58] Field of Search ....................... 73/35, 339 A, 346

[56] References Cited

U.S. PATENT DOCUMENTS

| 3,201,972 | 8/1965 | Krause | 73/35 |
| 3,214,977 | 11/1965 | Apfel | 73/339 A |
| 3,403,509 | 10/1968 | Eastman | 73/339 A |
| 3,487,640 | 1/1970 | Wostl et al. | 73/35 |
| 3,618,385 | 11/1971 | Kelley et al. | 73/339 A |

Primary Examiner—S. Clement Swisher
Attorney, Agent, or Firm—Warren D. Hill

[57] ABSTRACT

The bulk temperature of the gas in a piston engine during combustion is determined by detecting the high frequency pressure oscillation in the combustion chamber operating the engine to produce knock and measuring the frequency of the lowest frequency mode of the high frequency knock signal. The frequency or inversely the period of that signal is a function of the gas temperature.

3 Claims, 4 Drawing Figures

METHOD OF MEASUREMENT OF BULK TEMPERATURES OF GAS IN ENGINE CYLINDERS

This invention relates to a method of measuring bulk temperatures in an internal combustion piston engine and particularly to such a method using only the pressure waves naturally occurring in the combustion chamber.

Knowledge of bulk temperature is important in the study of the functioning of the engine, cylinder to cylinder distribution, cycle to cycle variations and other engine characteristics. In particular, knowledge of peak bulk temperatures in an internal combustion engine is important for understanding the formation of emissions, particularly oxides of nitrogen and their control. Knowledge of bulk temperature can, therefore, aid significantly in optimizing engine design for fuel economy, performance, drivability and reduced emissions. Information on such temperature can also be used to affect better engine control through an onboard microprocessor system.

Instantaneous measurements of temperature in an engine are difficult to make. Previously this has required complicated scientific instrumentation that has been difficult if not impossible to install in a working engine. For example, spectroscopic measurements have been used. Also an ultrasonic method has been used where sound is transmitted from a sound transducer through the gas mixture in the engine and the time of transmittal over a known path is measured to determine the speed of sound in the gas. The temperature of the gas can be derived from this information since the speed of sound depends upon the temperature of the gas.

According to the present invention, however, it has been established that the bulk temperature of the gas can be determined using the same principles involved in the above-mentioned ultrasonic method wherein no artificially induced acoustical pressure waves are employed.

It is, therefore, an object of this invention to determine bulk temperatures in an internal combustion engine at various times during combustion using information naturally occurring in the engine. It is a further object to provide such a method which requires no complicated instrumentation.

The method of the invention is carried out by operating an internal combustion piston engine to produce a knock event, detecting the pressure oscillations characteristic of the knock event to provide corresponding electrical signals, and at one or more sampling points measuring the frequency or period of the lowest mode resonance of the pressure oscillation which varies according to the bulk temperature of the gas during combustion.

The above and other advantages will be made more apparent from the following specification taken in conjunction with the accompanying drawings wherein like reference numerals refer to like parts and wherein.

It is well known that compression ignition causes a rapid increase in pressure within the combustion chamber of an engine which is accompaned by a characteristic high frequency pressure oscillation in the pressure-time trace. This type of ignition and its accompanying high frequency pressure oscillation is generally called knock because of the associated noise generated by the engine. At low levels knock is inaudible but it is still detectable electronically. With diesel engines, knock occurs at all operating conditions. With the spark ignition gasoline engines, it is usually thought to occur under high load, low RPM conditions. However, low level knock is often detectable also at other operating conditions. It is the high frequency content of knock that forms the basis of the method discussed here. This signal has a large amplitude at the onset of the knock event and thereafter diminishes; it is generally detectable for about 60° of crank angle.

It is already known that the high frequency pressure oscillation is due to cavity resonance in the gas of the combustion chamber resulting from rapid ignition of the air-fuel mixture. Rapid ignition provides the pressure excitation which sets the resonance modes of the combustion chamber volume into oscillation. The lowest frequency mode is the strongest. Its frequency can be determined either by simply counting the peaks in the high frequency oscillation or by a spectral analysis. The frequency of this mode is given by the equation $f = (c/B) \times k$ where c is the speed of sound within the gas of the combustion chamber, B is the bore of the cylinder and k is a nondimensional factor dependent on the geometry of the combustion chamber. The equation reveals that the frequency of the lowest mode which is the dominant constituent of the high frequency oscillation varies as the speed of sound c in the gas. The other quantities are constant dependent on the geometry of the combustion chamber volume. To a first approximation, the speed of sound is a function only of the gas temperature. More accurately, it is a function also of other parameters all of which are known. Hence, knowing the frequency of the pressure oscillation will determine the speed of sound in the gas which, in turn, will permit a determination of the corresponding bulk temperature of the gas at a given time. Throughout the knock interval, the gas temperature and thus the frequency varies greatly. A trace of the gas temperature is obtained by measuring the knock frequency at successive points during the knock interval.

Figure 1:
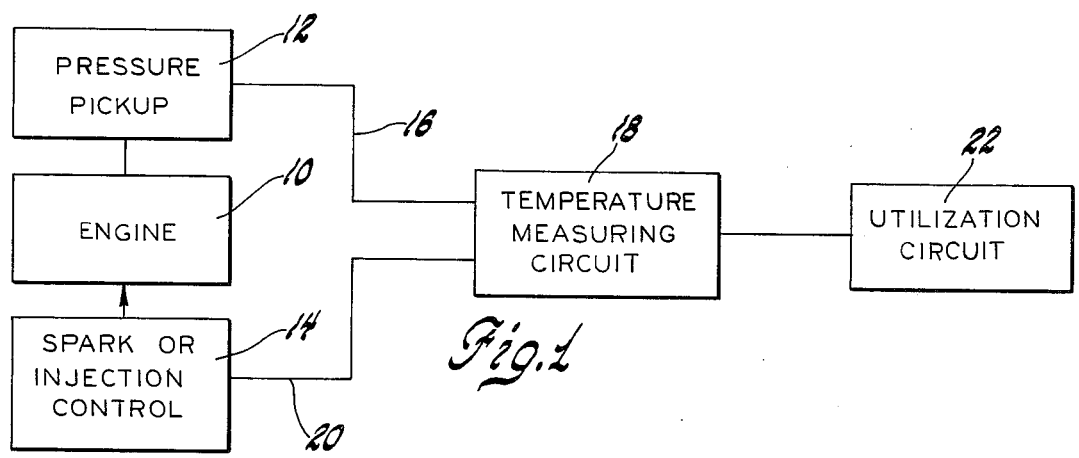
FIG. 1 is a block diagram of a system for carrying out the method of the invention.

A system for employing the method of the invention is illustrated in FIG. 1. An internal combustion piston engine 10 of either the spark ignition or diesel type is provided with a pressure pickup 12 or accelerometer to sense the cylinder pressure variations or the pressure induced vibrations in the engine. If desired, a separate pickup may be used for each cylinder of the engine where the individual temperatures are to be determined. For the purposes of this discussion, however, only a single pressure pickup is disclosed. The spark or injection control 14 represents the spark ignition circuit of a spark controlled engine or alternatively the fuel injection system of a diesel engine. In either case, the control 14 determines the time at which a knock will begin whether it be spark knock or diesel knock since the knock occurs shortly after spark or fuel injection. The pressure pickup 12 is connected by a conductor 16 to a temperature measuring circuit 18 while the spark or injection control 14 is connected by a conductor 20 to the temperature measuring circuit 18. The output of the temperature measuring circuit 18 is fed to a utilization circuit 22 which may be simply a display of temperature or an engine control circuit, for example.

In operation, the engine 10 is operated so as to produce a knock. In the case of a spark controlled engine, the spark is advanced until knock begins. The pressure pickup 12 provides pressure or vibration information in the form of an electrical signal to the temperature measuring circuit 18 which, in turn, analyzes the signal to determine the instantaneous knock frequency or its inverse, knock period, which varies according to the temperature of the gases within the combustion chamber. The information from the spark or injection control 14 which is fed to the temperature measuring circuit is used for gating purposes to exclude signals which occur at times outside of the engine knock interval and to select that portion of the knock interval to be sampled.

Figure 2:
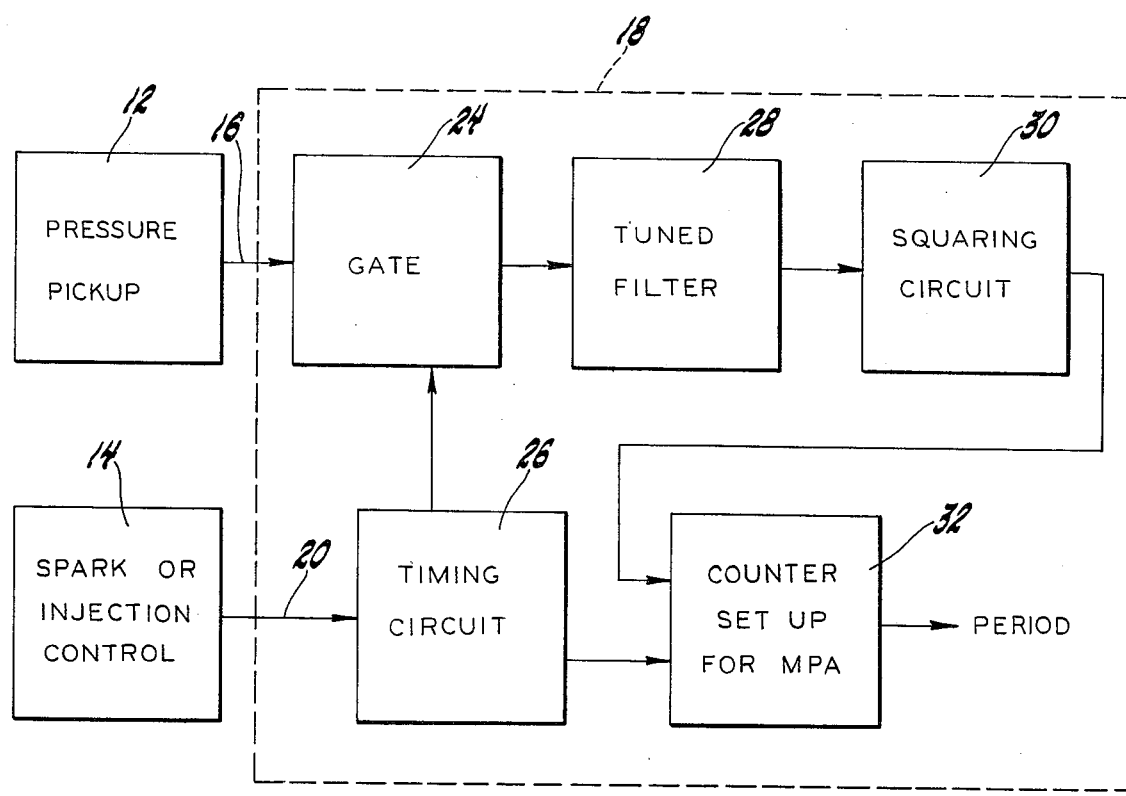
FIG. 2 is a block diagram of one embodiment of a temperature measuring circuit for the system of FIG. 1.

FIG. 2 illustrates an embodiment of the temperature measuring circuit 18. The pressure oscillation signal on line 16 is first fed to a gate 24 which is controlled by a timing circuit 26 that is synchronized with the spark or injector information on line 20. The timing circuit 26 emits a pulse correlated to the period when knock can occur so that the gate 24 is opened for an interval after ignition when knock is expected. The gate improves the signal to noise ratio by eliminating much of the extraneous signal which occurs during the rest of the cycle. The signal is then passed through a bandpass filter 28 which is tuned to pass the narrow range of frequencies associated with the lowest frequency cavity mode. For a typical internal combustion engine, this would be somewhere in the range from four to eight kilohertz. The filter output is connected to a squaring circuit 30 which enhances the signal by clipping and squaring it. The squaring circuit output then comprises a signal having the nature of a burst of pulses which occur each time the engine fires. To determine the lowest mode frequency of the knock signsl, the pulse bursts are fed to a multiple period averaging counter 32 where the average periods of the pulses in sampled portions of the burst is obtained. The counter comprises, for example, a Monsanto counter-timer Model No. 100C (manufactured by United Systems Corp., Dayton, Ohio) set up for multiple period averaging. The inverse of the period is, of course, frequency and is related to the temperature of the bulk gas in the cylinder. A signal from the timing circuit 26 is used to control the counter 32. The timing circuit can be set to generate an output to the counter 32 either at the beginning of the burst of pulses comprising the knock event or at a specific crank angle after ignition or injection during the burst of pulses. The counter can be used either to measure the average period of the burst of pulses or the period of two or more adjacent pulses in the burst at a particular crank angle. In this way either the average temperature during the burst or the temperature at a specific crank angle can be determined. The output of the counter 32 respresenting the measured period is fed to the utilization circuit 22. Of course, if desired, the period information may be used to generate a signal proportional to frequency of the knock signal. In either case, the output of the circuit 18 varies as a function of temperature.

Figure 3:
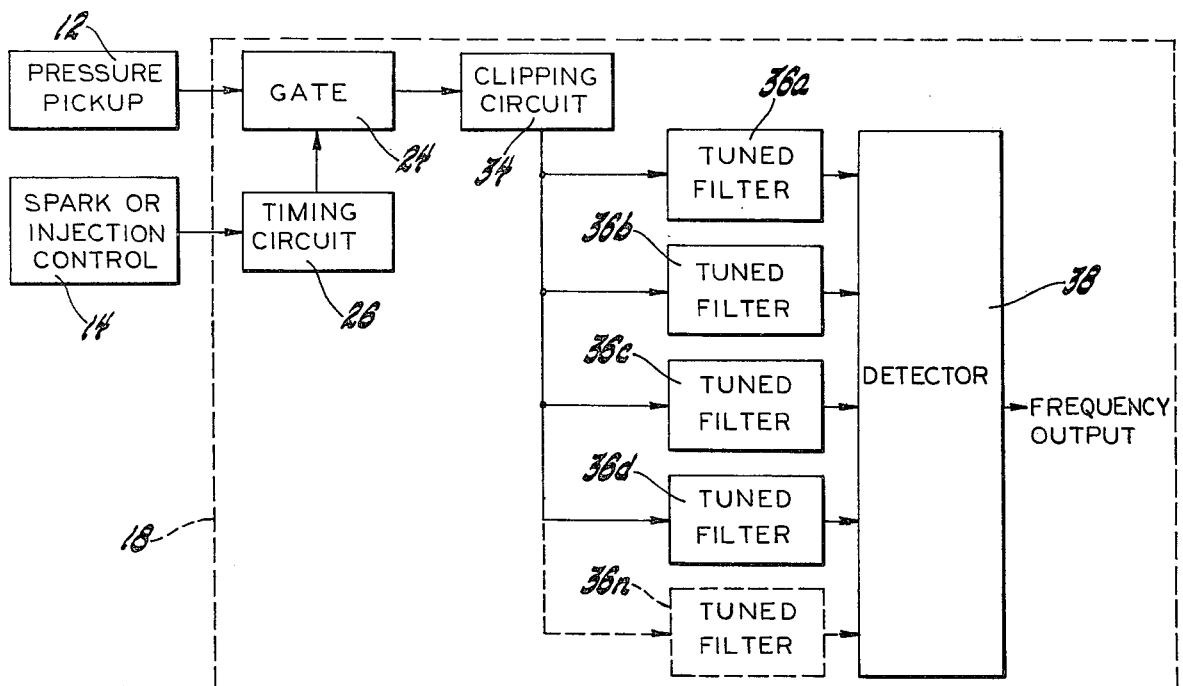
FIG. 3 is a block diagram of an alternative embodiment of the temperature measuring circuit of the system of FIG. 1.

FIG. 3 illustrates an alternate way of determining the knock frequency by the use of analog signal techniques. In this case, the temperature measuring circuit 18 includes a gate 24 and a timing circuit 26 as in the embodiment of FIG. 2. The output of the gate 24 is fed to a clipping circuit 34 where it is clipped to remove small noise components and to equalize the signal amplitudes. The clipped signal is then fed to a set of bandpass filters 36a through 36n which have their outputs connected to a detector 38. The bandpass filters are displaced from each other by a frequency equal to the desired frequency resolution within the range of the lowest frequency cavity mode. The filter which is most excited during the sampling time is indicative of the knock frequency. A particular filter is identified by the detector and an output is produced which identifies that particular filter and hence the knock frequency. In the case of two adjacent filters being equally excited, the frequency would lie between them and be so identified. With this system, the frequency resolution is dependent on the number of filters in the combination.

Figure 4:
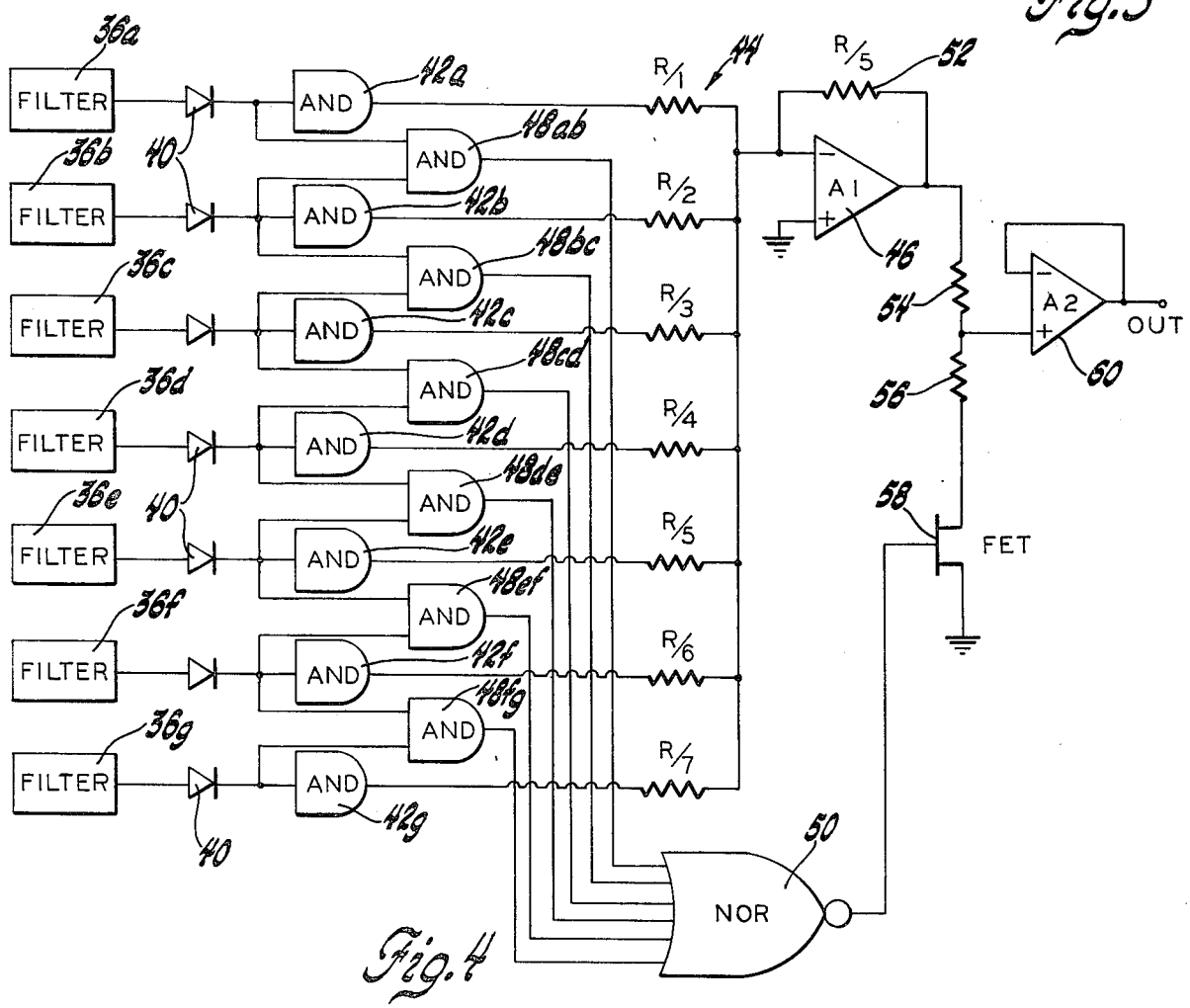
FIG. 4 is a logic diagram of the detector of FIG. 3.

The detector 38 is shown in FIG. 4 and comprises a logic circuit including a plurality of diodes 40 as input elements, each connected to the output of one of the filters 36a through 36g since seven filters are used for illustrative purposes. The signal from each filter passes through one of the diodes 40 to an AND gate 42a through 42g. Those AND gates selectively feed current through one of a plurality of resistors 44 which comprise input resistors to the negative terminal of an operational amplifier 46. The resistors have different values decreasing in succession such that the resistors corresponding to the gates 42a through 42g respectively have the value of R, R/2, R/3 ... R/7. The input diodes 40 are connected in pairs to a second series of AND gates identified as 48ab through 48fg. The input signals corresponding to the filters 36a and 36b are fed to the inputs of AND gate 48ab, the signals corresponding to filters 36b and 36c are connected to the inputs of AND gate 48bc and so forth so that when two adjacent filters are energized one of the 48 series of AND gates is also energized. The AND gates 48 have their outputs connected to the input of a NOR gate 50. The operational amplifier 46 includes a feedback resistor 52 having a value of R/5. The output of the operational amplifier is fed through a pair of equal resistors 54 and 56 connected in series with an FET 58 which has its gate electrode connected to and controlled by the output of the NOR gate 50. The junction of the resistors 54 and 56 is connected to the positive input terminal of an amplifier 60 which produces a DC output signal.

In operation each of the AND gates when turned on is set to produce an output of five volts. When one of the AND gates 42 is turned on, the output of the operational amplifier 46 will depend upon the value of the corresponding input resistor 44. That is, the gain of the amplifier 46 is determined according to which filter is excited. For example, if the filter 36c is excited causing the AND gate 42c to produce an output of five volts, the output of the amplifier 46 will be $$5\left(\frac{R/5}{R/3}\right)$$

or 3 volts. If filter 36f is energized to turn on the gate 42f, the output of amplifier 46 is $$5\left(\frac{R/5}{R/6}\right)$$

which equals 6 volts. In the event the knock frequency falls between the center frequencies of two filters causing both filters to be excited, the two corresponding AND gates of the 42 series will be energized but also the corresponding AND gate of the 48 series will be energized to activate the NOR gate 50 and the FET 58. The conduction of the FET 58 affects a voltage divider action by the resistors 54 and 56 so that the voltage produced by the operational amplifier 46 will in effect be divided by two at the input of the amplifier 60. This will result in an output voltage halfway between the voltages corresponding to the two filters when they are excited singly. For example, if the knock frequency falls between the center frequencies of the filters 36f and 36g, the AND gates 42f and 42g will be turned on so that there will be two inputs to the operational amplifier 46. The output of the amplifier is $$5\left(\frac{R/5}{R/6} + \frac{R/5}{R/7}\right)$$

which equals 13. Since that value is halved by the voltage divider 54, 56, the output of the amplifier 60 will be 6½ volts.

Another possible form of detector 38 would be a read only memory (ROM). The outputs from the filters could be treated as an input address with "0" being generated by unexcited filters and "1" being generated by excited filters. The ROM would be programmed to generate binary outputs for each address combination which when decoded would represent the knock frequency and, therefore, a certain temperature.

The output of the detector 38 is the output of the circuit 18 and represents the frequency of the knock signal.

It will thus be seen that the method according to this invention allows the measurement of bulk temperatures in internal combustion piston engines by analyzing the naturally occurring pressure oscillations which arise during knock. The instrumentation for carrying out the method is relatively simple and can be readily used for laboratory or field test and in addition may be incorporated in permanent onboard engine control circuitry to provide information which is utilized, for example, by a microprocessor for establishing optimum engine operating conditions.

The embodiments of the invention in which an exclusive property or privilege is claimed are defined as follows:

1. The method of measuring the bulk temperature of gas in the combustion chamber of an internal combustion piston engine during combustion comprising the steps of operating an internal combustion piston engine to produce knock, sensing the high frequency pressure oscillation occurring in the combustion chamber during a knock event to provide an electrical signal representing such oscillation, detecting in the electrical signal frequencies representing the lowest mode resonance of the pressure oscillation, and measuring the frequencies of the lowest mode resonance signal whereby each such frequency constitutes a measure of the bulk temperature of the gas in the combustion chamber at a given time.

2. The method of measuring the bulk temperature of gas in the combustion chamber of an internal combustion piston engine during combustion comprising the steps of operating an internal combustion piston engine to produce a knock event detectable by a pressure or vibration transducer, gating signals from the transducer to a measuring circuit during a knock event interval to eliminate extraneous signals occurring outside the knock event intervals and to provide an electrical signal representing the high frequency pressure oscillation which characterizes knock, filtering the signal to pass the narrow range of frequencies associated with the lowest mode frequency of the pressure oscillation, squaring the filtered signal to produce a burst of pulses for each knock event and, determining the period of the pulses in said burst at a desired sampling time wherein the period is a measure of the gas temperature in the combustion chamber.

3. The method of measuring the bulk temperature of gas in the combustion chamber of an internal combustion piston engine during combustion comprising the steps of operating an internal combustion piston engine to produce a knock event detectable by a pressure or vibration transducer, gating signals from the transducer to a measuring circuit during a knock event interval to eliminate extraneous signals occurring outside the knock event intervals and to provide for a selected sampling time an electrical signal representing the high frequency pressure oscillation which characterizes knock, filtering the signal by a plurality of parallel bandpass filters covering a series of successive small preset frequency bands which, in combination, span the lowest mode frequency of the pressure oscillation ranges, and detecting the particular filter which passes the largest signal to thereby identify the frequency of the pressure oscillation whereby such frequency constitutes a measure of the bulk temperature of the gas in the combustion chamber.

* * * * *